(12) United States Patent
Zhuang et al.

(10) Patent No.: US 12,277,791 B2
(45) Date of Patent: Apr. 15, 2025

(54) SYNTAX-DIRECTED MATHEMATICAL EXPRESSION RECOGNITION SYSTEM

(71) Applicants: Jianming Zhuang, Shenzhen (CN); Chung Kwong Chan, Taipei (TW)

(72) Inventors: Jianming Zhuang, Shenzhen (CN); Chung Kwong Chan, Taipei (TW)

(73) Assignee: SUNIA PTE. LTD, singapore (SG)

( * ) Notice: Subject to any disclaimer, the term of this patent is extended or adjusted under 35 U.S.C. 154(b) by 382 days.

(21) Appl. No.: 17/864,428

(22) Filed: Jul. 14, 2022

(65) Prior Publication Data

US 2024/0021001 A1    Jan. 18, 2024

(51) Int. Cl.
  *G06V 30/262*  (2022.01)
  *G06V 10/82*   (2022.01)
  *G06V 30/32*   (2022.01)

(52) U.S. Cl.
  CPC ............ *G06V 30/274* (2022.01); *G06V 10/82* (2022.01); *G06V 30/347* (2022.01)

(58) Field of Classification Search
  CPC .... G06V 30/262; G06V 30/274; G06V 10/82; G06V 30/19; G06V 30/32; G06V 30/347; G06V 10/774; G06V 30/142; G06V 30/1423; G06V 30/36; G06V 30/19147; G06V 30/226; G06N 3/08
  See application file for complete search history.

(56) References Cited

U.S. PATENT DOCUMENTS

| | | | | |
|---|---|---|---|---|
| 7,373,291 | B2* | 5/2008 | Garst | G06V 30/262 704/4 |
| 11,755,195 | B2* | 9/2023 | Weber | G06F 3/03545 715/268 |
| 2016/0179365 | A1* | 6/2016 | Angelov | G06F 3/03545 345/179 |
| 2021/0224528 | A1* | 7/2021 | Mannby | G06V 30/387 |

(Continued)

OTHER PUBLICATIONS

Ruiz et al. "Affine alignment for stroke classification." Proceedings Eighth International Workshop on Frontiers in Handwriting Recognition. IEEE, 2002 (Year: 2002).*
Cotogni et al. "Recursive recognition of offline handwritten mathematical expressions." 2020 25th International Conference on Pattern Recognition (ICPR). IEEE, 2021 (Year: 2021).*

(Continued)

*Primary Examiner* — Stephen R Koziol
*Assistant Examiner* — Benedict E Lee

(57) ABSTRACT

A syntax-directed mathematical expression recognition system combines online handwritten mathematical expression, offline handwritten and printed mathematical expression and structured mathematical expressions to generate a huge amount of mathematical expressions which are usable in training of neural networks. An end to end learning way is used to train the neural network for increment of learning effect and recognition ability. The problem of overfitting in multi-layer neural networks is reduced effectively so as to increase accuracy of testing set. The mode of neural network is usable for online handwritten mathematical expression, offline handwritten and printed mathematical expression. Therefore only one recognition system is used, no other system is needed. For further new mathematical expressions (Continued)

are needed for recognition, only a small amount of new samples are used and grammars of the mathematical program language only needs to be slightly adjusted for expanding recognition ability of the neural network.

9 Claims, 4 Drawing Sheets

(56) References Cited

U.S. PATENT DOCUMENTS

| | | | | |
|---|---|---|---|---|
| 2021/0279457 | A1* | 9/2021 | Suyash | G06V 30/347 |
| 2021/0350122 | A1* | 11/2021 | Dixon | G06V 30/36 |
| 2022/0156486 | A1* | 5/2022 | Chen | G06V 10/44 |
| 2023/0084641 | A1* | 3/2023 | Roy | G06V 30/274 |
| | | | | 382/182 |

OTHER PUBLICATIONS

Ung et al. "A transformer-based math language model for handwritten math expression recognition." International Conference on Document Analysis and Recognition. Cham: Springer International Publishing, 2021 (Year: 2021).*

Clark et al. "System for the recognition of online handwritten mathematical expressions." Eurocon 2013. IEEE, 2013 (Year: 2013).*

Pranoto et al. "Real time handwriting recognition for mathematic expressions using Hidden Markov Model." 2016 International Seminar on Intelligent Technology and Its Applications (ISITIA). IEEE, 2016 (Year: 2016).*

Chan et al. "Stroke extraction for offline handwritten mathematical expression recognition." IEEE Access 8 (2020): 61565-61575 (Year: 2020).*

Dos Reis et al. "Mathreader: Api for handwritten mathematical expressions recognition." 2020 IEEE 32nd International Conference on Tools with Artificial Intelligence (ICTAI). IEEE, 2020 (Year: 2020).*

* cited by examiner

SYNTAX-DIRECTED MATHEMATICAL EXPRESSION RECOGNITION SYSTEM

FIELD OF THE INVENTION

The present invention is related to mathematical expression recognition by neural networks, and in particular to a syntax-directed mathematical expression recognition system.

BACKGROUND OF THE INVENTION

Online handwritten mathematical expressions mean mathematical expressions which are acquired from users to handwrite mathematical expressions into an electronic device (such as touch pens, handwriting panels or touch panels, etc.) so that the coordinates of the strokes of the mathematical expressions can be directly acquired. In the present invention, the mathematical expressions include mathematical symbols and mathematical formulas which are assembled by the mathematical symbols. Furthermore, respective position relations between mathematical symbols are also recorded. The recognition based on above data is called as online recognition.

The so call Offline Handwritten Mathematical Expression or Printed Mathematical Expression means to acquire mathematical expressions which does not corresponding to above mentioned online handwritten states. For example, two dimensional figures or printed mathematical expression which does not include information about the strokes and the sequences of the strokes. The recognition of the mathematical expression based on these data (offline) is called offline recognition.

Conventionally, in training a neural network for recognition of mathematical expressions, a large amount mathematical expressions are necessary in training stage. The number of sample needed may be achieved a value of hundred thousands. Such large amount of mathematical expressions must be generated mechanically, while conventional ways for generating mathematical expressions needs very long time. Furthermore, handwriting samples are very difficult to collect. Furthermore, a trained neural network cannot be modified and expanded. All these are problems encountered in the prior art.

SUMMARY OF THE INVENTION

Accordingly, the object of the present invention is to provide a syntax-directed mathematical expression recognition system, wherein combining online handwritten mathematical expression, offline handwritten and printed mathematical expression and structured mathematical expressions to generate a huge amount of mathematical expressions which are usable in training of neural networks. An end to end learning way is used to train the neural network so as to have better learning effect and recognition ability is promoted. The problem of overfitting in multi-layer neural networks is reduced effectively. The generalization is increased. As a result the accuracy of testing set is enhanced. The mode of neural network of the present invention is usable for online handwritten mathematical expression, offline handwritten and printed mathematical expression. Therefore only one recognition system is used, no other system is needed so that cost is reduced greatly. For further new mathematical expressions are needed for recognition, only a small amount of new samples are used and grammars of the mathematical program language only needs to be slightly adjusted for expanding recognition ability of the neural network. In the present invention, the mathematical language grammar is used in training and thus the recognition results are matched to mathematical grammars. Furthermore, the present invention is beneficial for customization.

To achieve above object, the present invention provides a syntax-directed mathematical expression recognition system, comprising: an online handwritten mathematical expression unit for receiving online handwritten mathematical expressions which includes strokes of mathematical symbols and related texts of the mathematical expressions so as to obtain coordinates of the strokes and program codes corresponding to the online handwritten mathematical expression; the coordinates of the strokes and the program codes being formed as online handwritten samples, the online handwritten mathematical expression unit including an online database for storing a great number of online handwritten samples usable in training of the neural networks; an offline handwritten and printed mathematical expression unit for receiving the offline handwritten and printed mathematical expressions with preset program codes, the offline handwritten and printed mathematical expressions and related program codes being formed an offline handwritten and printed mathematical expression samples which are stored in an offline database; a structured mathematical expression generator for generating structured mathematical expressions; the mathematical expression generator including a corpus and a mathematical grammar database; the structured mathematical expression generator collecting a large amount of program codes of mathematical expressions which are then stored in the corpus; the mathematical grammar database storing grammars of specific mathematical program languages, the structured mathematical expression generator generating a large amount of structured mathematical expressions by using the program codes of the mathematical expressions in the corpus based on the grammars in the mathematical grammar database; and a handwriting sample generator connected to the online handwritten mathematical expression unit, the offline handwritten and printed mathematical expression unit, and the structured mathematical expression generator; the handwriting sample generator serving to generate a huge amount of mathematical expression handwriting samples for the mathematical expressions in the online handwritten mathematical expression unit, the offline handwritten and printed mathematical expression unit and the structured mathematical expression generator for being used in training of the neural network; and a mathematical expression recognition neural network including an input interface and an output interface; the input interface including a plurality of input terminals and the output interface includes a plurality of output terminals, the input interface being connected to the handwriting sample generator for receiving the mathematical expression handwriting samples; the output interface serving to receive the program codes corresponding to the mathematical expression handwriting samples inputted to the input interface; and in prediction stage, coordinates of strokes of a mathematical expression are inputted to the input interface of the mathematical recognition neural network for recognition; the output interface of the neural network outputs at least one program code which is corresponding to the input mathematical expression.

DETAILED DESCRIPTION OF THE INVENTION

Figure 1:
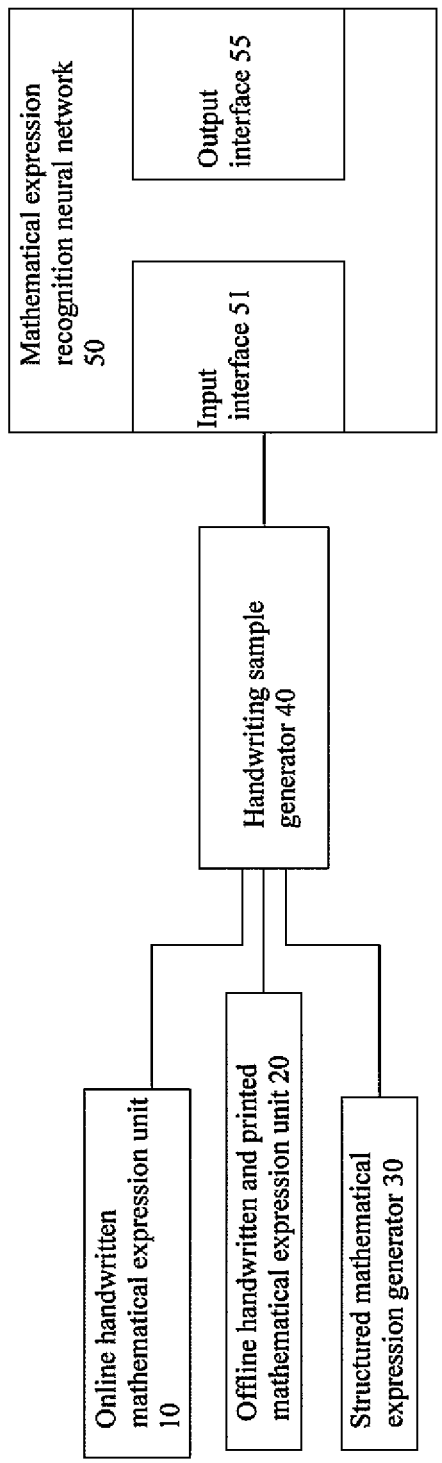
FIG. 1 is a structured block diagram showing the elements of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 4, the system of the present invention is illustrated. The present invention includes the following elements.

An online handwritten mathematical expression unit 10 serves to receive online handwritten mathematical expressions including the strokes of mathematical symbols and related texts of the mathematical expressions so as to obtain coordinates of the strokes and program codes corresponding to the online handwritten mathematical expression (for some specific computer languages, such as LaTeX or MathML (Mathematical Markup Language, however, any computer languages usable for mathematical expressions are allowable in the present invention). The program codes can be converted into mathematical expressions after compiling or interpretation. The coordinates of the strokes and the program codes are formed as online handwritten samples 12. Preferably, coordinates of the strokes are stored by InkML (Ink Markup Language).

For example, for mathematical program language, LaTeX, a program code of \\frac {1} {3} means ⅓.

In training of neural networks, the coordinates of the strokes of the mathematical expressions are utilized as inputs of the neural networks and the program codes are used as outputs of the neural networks.

The online handwritten mathematical expression unit 10 includes an online database 15 for storing a great number of online handwritten samples 12 for training of the neural networks.

In the online handwritten mathematical expression unit 10, sub-mathematical expressions are extracted from the original online handwritten mathematical expressions to form as independent mathematical expressions, where a sub-mathematical expression is a part of the original online handwritten mathematical expression. The coordinates of the strokes and program codes of the sub-mathematical expressions are also extracted so as to form online handwritten samples 12 which are then stored in the online database 15.

An offline handwritten and printed mathematical expression unit 20 serves for receiving the offline handwritten and printed mathematical expressions with preset program codes, that the program codes of the offline handwritten and printed mathematical expressions are known in advance. The offline handwritten and printed mathematical expressions and related program codes are formed an offline handwritten and printed mathematical expression samples 22 which are then stored in an offline database 25. For example, the offline handwritten and printed mathematical expression is a two dimensional figures (for example, having formatted of PNG) and the program codes are stored by markup language, such as MathML language.

A structured mathematical expression generator 30 serves for generating structured mathematical expressions. The mathematical expression generator 30 includes a corpus 34 and a mathematical grammar database 33. The structured mathematical expression generator 30 collects a large amount of program codes of mathematical expressions (for example, through networks) which are stored in the corpus 34. The mathematical grammar database 33 stores grammars of specific mathematical program languages, such as Stochastic context-free grammar. The Stochastic context-free grammar describes grammars of program codes of mathematical expressions for some specific program languages, such as LaTeX or MathML. The structured mathematical expression generator 30 generates a large amount of structured mathematical expressions by using the program codes of the mathematical expressions in the corpus 34 based on the grammars in the mathematical grammar database 33. The structured mathematical expressions may be stored by using mathematical markup languages, such as MathML.

A handwriting sample generator 40 is connected to the online handwritten mathematical expression unit 10, the offline handwritten and printed mathematical expression unit 20, and the structured mathematical expression generator 20. The handwriting sample generator 40 serves to generate a huge amount of mathematical expression handwriting samples 42 for the mathematical expressions in the online handwritten mathematical expression unit 10, the offline handwritten and printed mathematical expression unit 20 and the structured mathematical expression generator 30 for being used in training of the neural network. In the present invention, the mathematical expression handwriting samples 42 may be as large as several hundred thousands. Ways for generating the mathematical expression handwriting samples are described hereinafter.

(a) The coordinates of the strokes and the program codes of the online handwritten mathematical expressions in the online handwritten samples 12 are formed as corresponding mathematical expression handwriting samples 42.

(b) Obtaining the strokes of the offline handwritten and printed mathematical expressions in the offline handwritten and printed mathematical expression samples 22 so as to acquire coordinates of the strokes, wherein the programs codes of the offline handwritten and printed mathematical expression are known in advance as defined above. Therefore, these coordinates and program codes for the offline handwritten and printed mathematical expressions are formed as corresponding mathematical expression handwriting samples 42.

(c) Acquiring mathematical expression handwriting samples 42 for the structured mathematical expressions in the structured mathematical expression generator 30 by the way that: (1) the structured mathematical expressions are converted into (rendered as) printed form mathematical expressions, and for each mathematical symbol in the printed form mathematical expression, a minimum rectangular frame just containing a corresponding mathematical symbol is acquired. (2) The printed form mathematical expressions are divided into several sub-mathematical expressions which can find identical mathematical expressions in the online handwritten mathematical expression samples 12. If the sub-mathematical expressions does not find corresponding mathematical expressions in the online handwritten mathematical expression samples 12, then these sub-mathematical expressions does not used in the following process. The minimum rectangular frame for each mathematical symbol is adjusted. (3) To find coordinates of strokes in the online handwritten mathematical expression samples 12 which correspond to the strokes of each symbol in the sub-mathematical expressions. Then affine transformation is performed to above found coordinates of the strokes to acquire transformed coordinates of strokes of each symbol and the program codes of the structured mathematical expression which are combined as a mathematical expression handwriting sample 42. (4) The mathematical expression handwriting sample 42 is rotated randomly or size-changed randomly so as to generate more and more mathematical expression handwriting samples 42.

Figure 2:
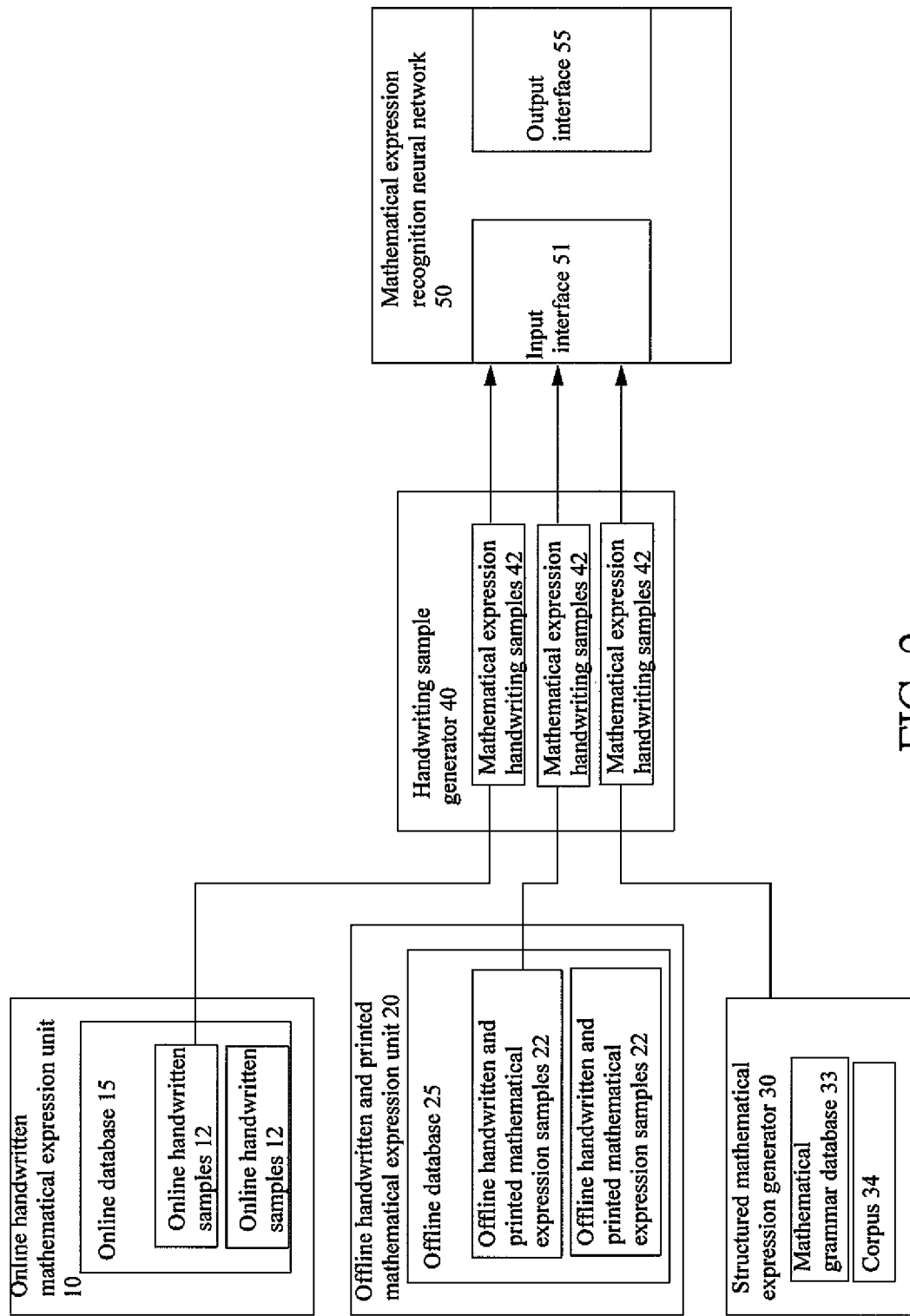
FIG. 2 is a schematic view showing the training of the mathematical recognition neural network according to the present invention.

A mathematical expression recognition neural network 50 includes an input interface 51 and an output interface 55. The input interface 51 includes a plurality of input terminals 52 and the output interface 55 includes a plurality of output terminals 56. As illustrated in FIGS. 1 and 2, the input interface 51 is connected to the handwriting sample generator 40 for receiving the mathematical expression handwriting samples 42. The output interface 55 serves to receive the program codes corresponding to the mathematical expression handwriting samples inputted to the input interface 51.

In training stage, several tens or hundreds thousands of mathematical expression handwriting samples 42 are used. The coordinates of the strokes in the mathematical expression handwriting samples are inputted to the plurality of input terminals 52 of the input interface 51. The outputs of the output interface 55 are set as the program codes corresponding to the mathematical expression handwriting samples. Through a plurality of training stages, the weight values in the connecting lines of the neural network 50 are adjusted, the mathematical expression recognition neural network 50 is able to identify input mathematical expression handwriting samples 42.

In prediction stage, coordinates of strokes of a mathematical expression 100 matching to the mathematical grammars are inputted to the input interface 51 of the mathematical recognition neural network 50 for recognition. The output interface 55 of the neural network outputs at least one program code which is corresponding to the input mathematical expression 100.

Figure 3:
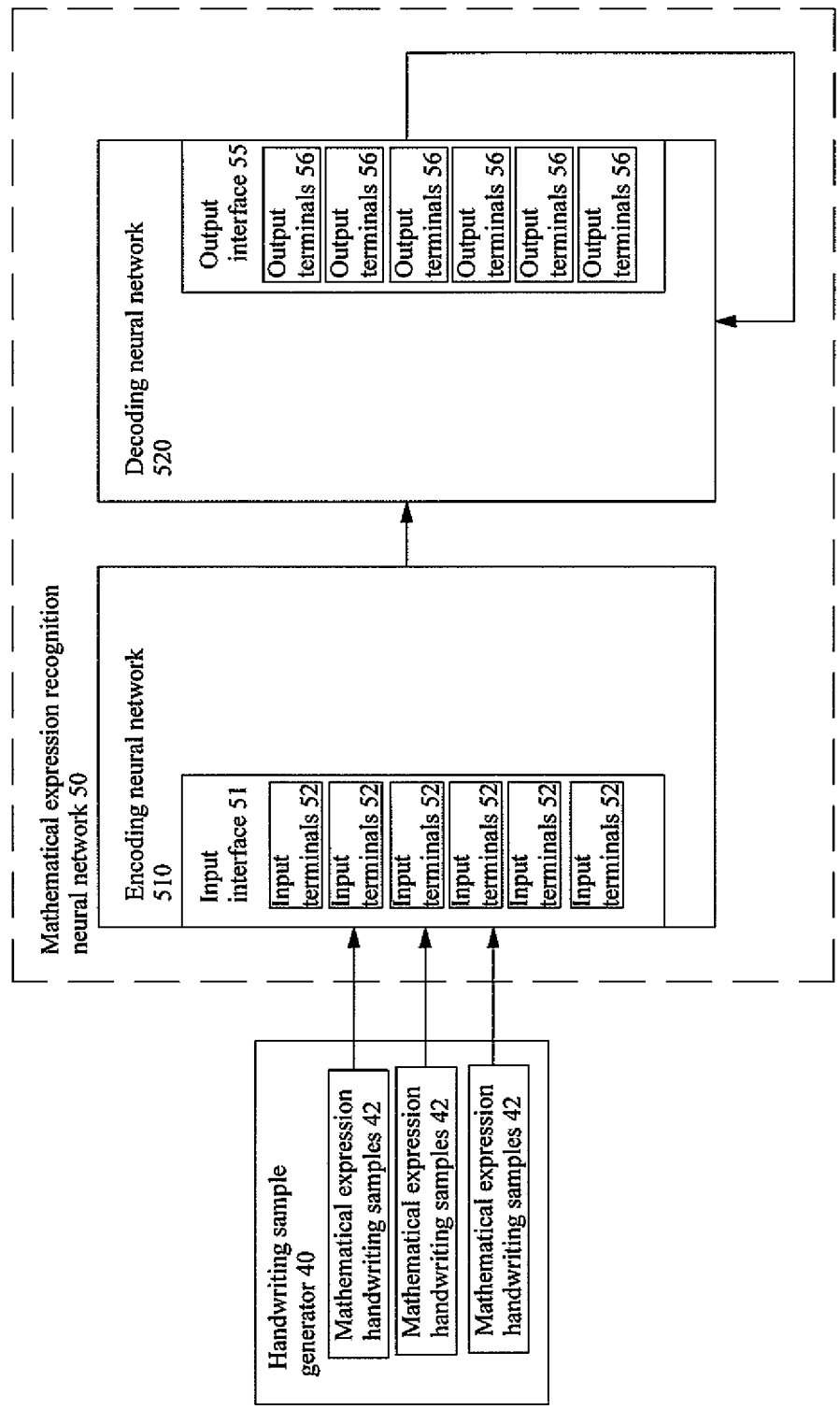
FIG. 3 is another schematic view showing the training of the mathematical recognition neural network according to the present invention.
Figure 4:
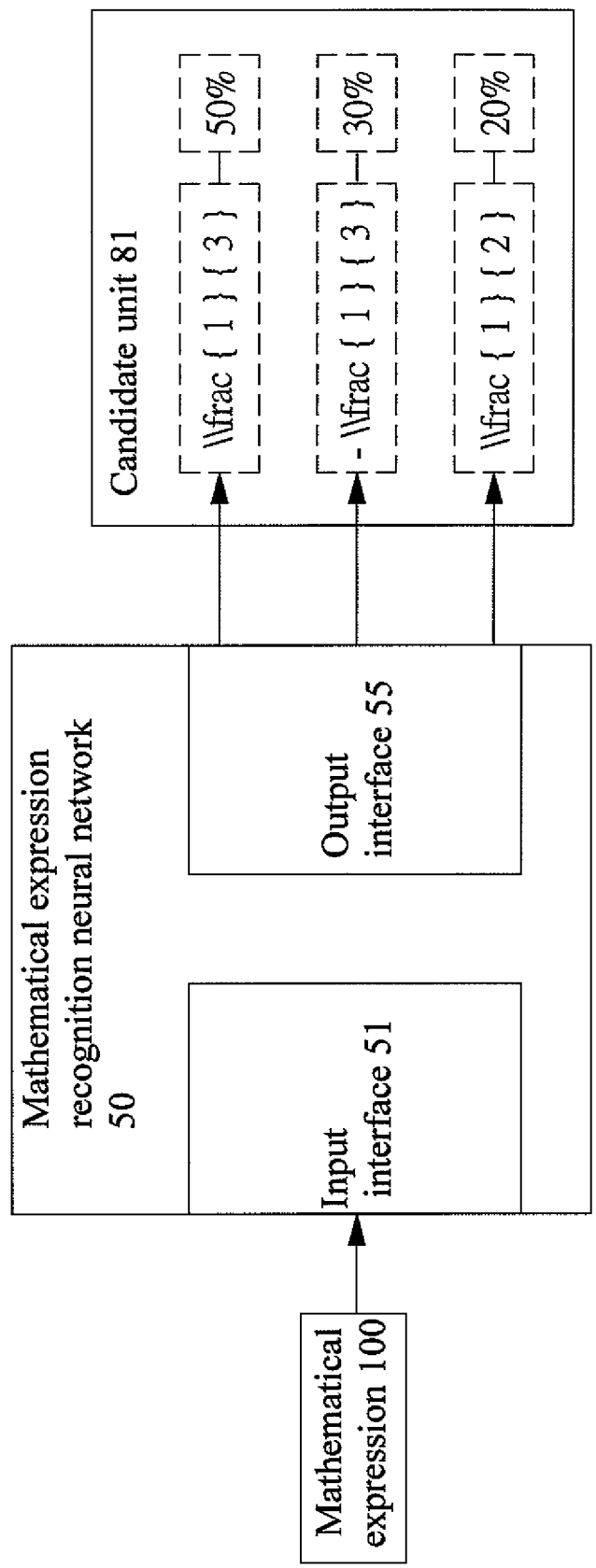
FIG. 4 is a schematic view showing the application of the present invention, in which a predict stage of the mathematical recognition neural network according to the present invention is shown.

As illustrated in FIG. 3, the mathematical recognition neural network 50 includes an encoding neural network 510 which includes the input interface 51, and a decoding neural network 520 which includes the output interface 55. The encoding neural network 510 serves to find features of the input mathematical expression 510 and then these features are inputted to the decoding neural network 520. The output of the decoding neural network 520 includes parts of program codes of the input mathematical expression 100 which are indicated with statistical reliability. These parts of the program codes and the reliabilities are auto-regressed back to the input of the decoding neural network 520 for recognition again so as to acquire another parts of the program code and reliabilities. These processes can be performed again and again until a desired reliabilities is got or a preset times is achieved. The resulted final program codes and reliabilities are stored in a candidate unit 81. The way of auto-regression is such as the predict analysis method by LL(1) grammar. Referring to FIG. 4, an application is illustrated, that the candidate set 81 includes three program codes \\frac {1} {3}, –\\frac {1} {3}, and \\frac {1} {2} which have respective reliabilities of 50%, 30% and 20%. This means the input mathematical expression 100 is most possibly \\frac {1} {3} with a possibility of 50%.

Advantages of the present invention are that combining online handwritten mathematical expression, offline handwritten and printed mathematical expression and structured mathematical expressions to generate a huge amount of mathematical expressions which are usable in training of neural networks. An end to end learning way is used to train the neural network so as to have better learning effect and recognition ability is promoted. The problem of overfitting in multi-layer neural networks is reduced effectively. The generalization is increased. As a result the accuracy of testing set is enhanced. The mode of neural network of the present invention is usable for online handwritten mathematical expression, offline handwritten and printed mathematical expression. Therefore only one recognition system is used, no other system is needed so that cost is reduced greatly. For further new mathematical expressions are needed for recognition, only a small amount of new samples are used and grammars of the mathematical program language only needs to be slightly adjusted for expanding recognition ability of the neural network. In the present invention, the mathematical language grammar is used in training and thus the recognition results are matched to mathematical grammars. Furthermore, the present invention is beneficial for customization.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A syntax-directed mathematical expression recognition system, comprising:

an online handwritten mathematical expression unit for receiving online handwritten mathematical expressions which includes strokes of mathematical symbols and related texts of the mathematical expressions so as to obtain coordinates of the strokes and program codes corresponding to the online handwritten mathematical expression; the coordinates of the strokes and the program codes being formed as online handwritten samples, the online handwritten mathematical expression unit including an online database for storing a great number of online handwritten samples usable in training of a neural network;

an offline handwritten and printed mathematical expression unit for receiving offline handwritten and printed mathematical expressions with preset program codes, the offline handwritten and printed mathematical expressions and related program codes being formed an offline handwritten and printed mathematical expression samples which are stored in an offline database;

a structured mathematical expression generator for generating structured mathematical expressions; the mathematical expression generator including a corpus and a mathematical grammar database; the structured mathematical expression generator collecting a large amount of program codes of mathematical expressions which are then stored in the corpus; the mathematical grammar database storing grammars of specific mathematical program languages, the structured mathematical expression generator generating a large amount of structured mathematical expressions by using the program codes of the mathematical expressions in the corpus based on the grammars in the mathematical grammar database; and a handwriting sample generator connected to the online handwritten mathematical expression unit, the offline handwritten and printed mathematical expression unit, and the structured mathematical expression generator; the handwriting sample generator serving to generate a huge amount of mathematical expression handwriting samples for the mathematical expressions in the online handwritten mathematical expression unit, the offline handwritten and printed mathematical expression unit and the structured mathematical expression generator for being used in training of the neural network; and a mathematical expression recognition neural network including an input interface and an output interface; the input interface including a plurality of input terminals and the output interface includes a plurality of output terminals, the input interface being connected to the handwriting sample generator for receiving the mathematical expression handwriting samples; the output interface serving to receive the program codes corresponding to the mathematical expression handwriting samples inputted to the input interface; and in prediction stage, coordinates of strokes of a mathematical expression are inputted to the input interface of the mathematical recognition neural network for recognition; the output interface of the neural network outputs at least one program code which is corresponding to the input mathematical expression;

wherein the ways for generating mathematical expression handwriting sample are that:

(a) the coordinates of the strokes and the program codes of the online handwritten mathematical expressions in the online handwritten samples are directly formed as corresponding mathematical expression handwriting samples;

(b) obtaining the strokes of the offline handwritten and printed mathematical expressions in the offline handwritten and printed mathematical expression samples so as to acquire coordinates of the strokes; these coordinates and the preset program codes for the offline handwritten and printed mathematical expressions are formed as corresponding mathematical expression handwriting samples;

(c) acquiring mathematical expression handwriting samples for the structured mathematical expressions in the structured mathematical expression generator by the ways that: (1) the structured mathematical expressions are converted into or rendered as printed form mathematical expressions, and for each mathematical symbol in the printed form mathematical expression, a minimum rectangular frame just containing a corresponding mathematical symbol is acquired; (2) the printed form mathematical expressions are divided into several sub-mathematical expressions which can find identical mathematical expressions in the online handwritten mathematical expression samples; if the sub-mathematical expressions are not found mathematical expressions in the online handwritten mathematical expression samples, then these sub-mathematical expressions are not used in the following process; the minimum rectangular frame for each mathematical symbol is adjusted; (3) to find coordinates of strokes in the online handwritten mathematical expression samples which correspond to the strokes of each symbol in the sub-mathematical expressions; then affine transformation is performed to above found coordinates of the strokes to acquire transformed coordinates of strokes of each symbol and the program codes of the structured mathematical expression which are combined as a mathematical expression handwriting sample; (4) The mathematical expression handwriting sample is rotated randomly or size-changed randomly so as to generate more and more mathematical expression handwriting samples; and wherein the mathematical recognition neural network includes an encoding neural network which includes the input interface; and a decoding neural network which includes the output interface; the encoding neural network serves to find features of the input mathematical expression and then these features are inputted to the decoding neural network; the output of the decoding neural network includes parts of program codes of the input mathematical expression which are indicated with statistical reliability; these parts of the program codes and the reliabilities are auto-regressed back to the input of the decoding neural network for recognition again so as to acquire another parts of the program code and reliabilities; these processes are performed again and again until a preset reliabilities is obtained or a preset times is achieved for auto-regression; the resulted final program codes and reliabilities are stored in a candidate unit.

2. The syntax-directed mathematical expression recognition system as claimed in claim 1, wherein the way of auto-regression is a predict analyzing method using LL(1) grammars.

3. The syntax-directed mathematical expression recognition system as claimed in claim 1, wherein in the online handwritten mathematical expression unit, sub-mathematical expressions are extracted from the original online handwritten mathematical expressions to form as independent mathematical expressions, where a sub-mathematical expression is a part of the original online handwritten mathematical expression; the coordinates of the strokes and program codes of the sub-mathematical expressions are also extracted so as to form online handwritten samples which are then stored in the online database.

4. The syntax-directed mathematical expression recognition system as claimed in claim 1, wherein the mathematical program language is LaTeX or MathML(Mathematical Markup Language).

5. The syntax-directed mathematical expression recognition system as claimed in claim 1, wherein coordinates of the strokes of the online handwritten sample are stored by InkML(Ink Markup Language).

6. The syntax-directed mathematical expression recognition system as claimed in claim 1, wherein the offline handwritten and printed mathematical expression is two dimensional figures and the program codes are stored by markup language.

7. The syntax-directed mathematical expression recognition system as claimed in claim 1, wherein the mathematical grammar database stores syntax rules of specific mathematical program languages which is Stochastic context-free grammar.

8. The syntax-directed mathematical expression recognition system as claimed in claim 7, wherein the Stochastic context-free grammar describes grammars of program codes of mathematical expressions for program languages of LaTeX or MathML.

9. The syntax-directed mathematical expression recognition system as claimed in claim 1, wherein the structured mathematical expressions is stored by using mathematical markup languages.

\* \* \* \* \*